United States Patent [19]
De Jager et al.

[11] Patent Number: 5,649,569
[45] Date of Patent: Jul. 22, 1997

[54] WARP TENSION MEASURING APPARATUS

[75] Inventors: Godert De Jager, Volketswil; Lorant Gacsay, Zürich, both of Switzerland

[73] Assignee: Sulzer Rueti AG, Rueti, Switzerland

[21] Appl. No.: 557,663

[22] Filed: Nov. 13, 1995

[30] Foreign Application Priority Data

Dec. 13, 1994 [EP] European Pat. Off. ............ 94810722

[51] Int. Cl.⁶ .................................................. D03D 49/04
[52] U.S. Cl. ........................... 139/110; 139/35; 139/97; 73/774; 73/855
[58] Field of Search ..................... 73/159, 160, 774, 73/781, 775, 855; 139/35, 110, 97, 194; 242/413.3, 419.3

[56] References Cited

U.S. PATENT DOCUMENTS

| | | | |
|---|---|---|---|
| 4,023,402 | 5/1977 | Watanabe | 73/855 |
| 4,106,628 | 8/1978 | Warkentin et al. | 209/74 M |
| 4,343,197 | 8/1982 | Suzuki et al. | 73/862.65 |
| 4,633,982 | 1/1987 | Swigert | 188/267 |
| 4,776,219 | 10/1988 | Friedrich | 73/726 |
| 4,800,751 | 1/1989 | Kobayashi et al. | 73/118.1 |
| 4,935,999 | 6/1990 | Lindemann | |

FOREIGN PATENT DOCUMENTS

| | | |
|---|---|---|
| 0 023 583 | 2/1981 | European Pat. Off. . |
| 0 385 061 | 9/1990 | European Pat. Off. . |
| 0 407 824 | 1/1991 | European Pat. Off. . |
| 0 595 072 | 5/1994 | European Pat. Off. . |

*Primary Examiner*—Andy Falik
*Attorney, Agent, or Firm*—Townsend and Townsend and Crew LLP

[57] ABSTRACT

A warp tension measuring apparatus for weaving machines or looms has a force sensor or pick-up (3) and a member (2) which is in active communication with the force sensor (3) to transfer a force acting on the members (2) onto the force sensor. The force sensor (3) is provided with a resilient element (9) to improve the introduction of force, on the one hand, and to damp mechanical oscillations, on the other hand.

20 Claims, 6 Drawing Sheets

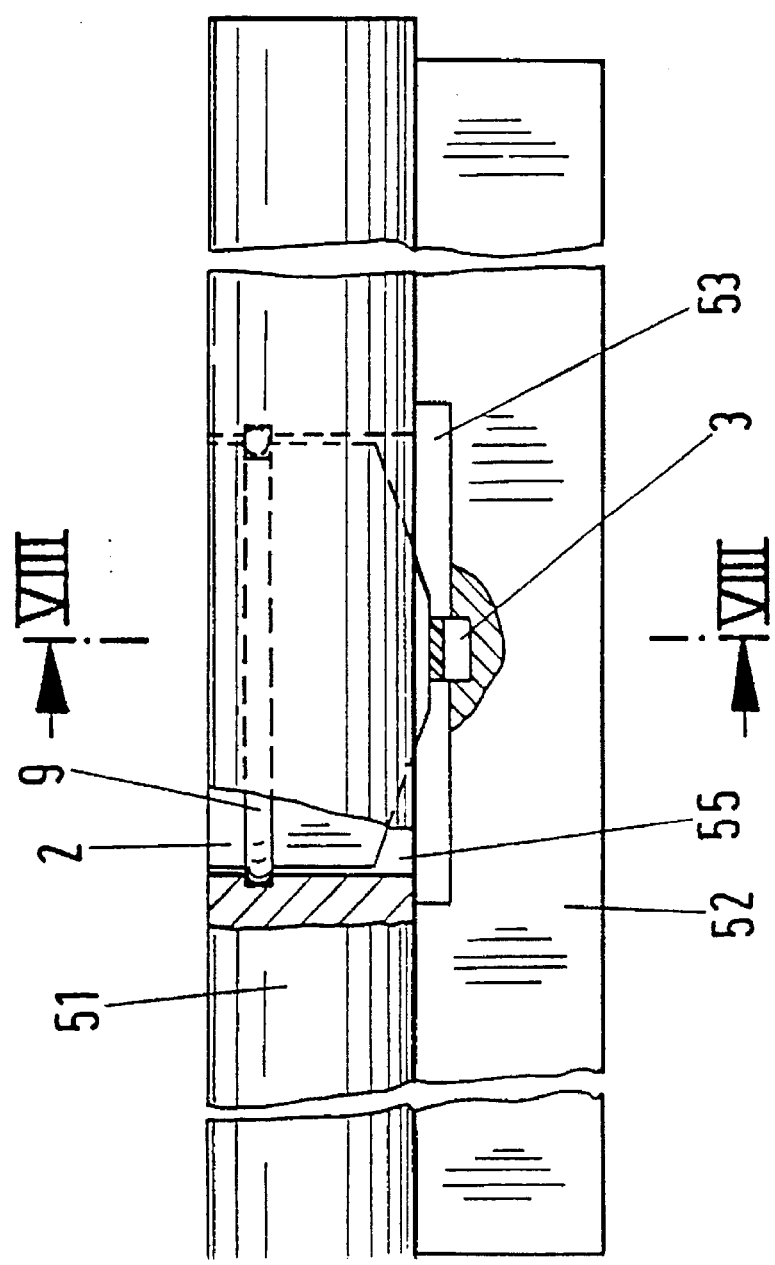

1

WARP TENSION MEASURING APPARATUS

BACKGROUND OF THE INVENTION

The invention relates to an apparatus for measuring the warp tension as well as to a weaving machine or loom having an apparatus of this kind.

An apparatus arranged on the breast beam for measuring the warp tension is known from CH-B 556 416 which is actuated by a force exerted by the running fabric.

A measurement device is described in EP-A 0 385 061 comprising a tube having a radially extending groove, a measurement beam arranged in the groove, a carrier arranged underneath the measurement beam and secured in the tube and two measurement value sensors for measuring the fabric tension, which is proportional to the warp yarn tension.

In this measurement device strain gauges are arranged on members which connect the carrier and the measurement beam and transmit a signal which corresponds to the bending deflection of the members.

The strain gauges are subjected to oscillations which are caused by the warps running over the measurement beam or by the weaving machine or loom. Such superimposed oscillations cannot be overcome by technical circuit measures and thus considerably falsify the measurement result, i.e. a dynamic warp tension measurement cannot be carried out. In another embodiment, pressure pick-ups are used which are arranged between the lower side of the measurement beam and the associated upper side of the carrier, so that the measurement beam lies freely on the pressure pick-ups.

In this embodiment, oscillations likewise beam arise and, moreover, during a change in running of the fabric, a tilting movement of the measurement beam arises within the cut-out which leads to a non-uniform force distribution. Furthermore, the installed length is restricted to a perpendicular arrangement of the measurement beam.

SUMMARY OF THE INVENTION

The invention seeks to remedy this. The invention satisfies the object of providing an apparatus for measuring the warp tension in which the warp tension is measured with a greater accuracy via an improved force introduction.

Alongside the retention function, the resilient element also fulfils a centering function in a particularly advantageous manner, so that the warp yarn tension is measured fully independently of the wrap-around angle, and fulfils a sealing function which screens the force sensor against contamination by fiber fly. Moreover, since the member is supported on the force sensor by the elastic means, the force transmission is, on the one hand, improved in an advantageous manner, and, on the other hand, small force changes and the mechanical oscillations are compensated so that the apparatus is particularly suited as an actual value sensor for an active warp tension regulator (with feedback).

It is advantageous when the force measurement device is a single force sensor, because, as a result of the resilient arrangement of the member, measurement of the total reaction force is possible.

BRIEF DESCRIPTION OF THE DRAWINGS

The invention will be explained in the following with reference to the accompanying drawings which show:

FIG. 7 a side view of a second embodiment of an apparatus in accordance with the invention;

FIG. 8 a cross-sectional view taken along the line VIII—VIII in FIG. 7;

DESCRIPTION OF THE PREFERRED EMBODIMENTS

Figure 1:
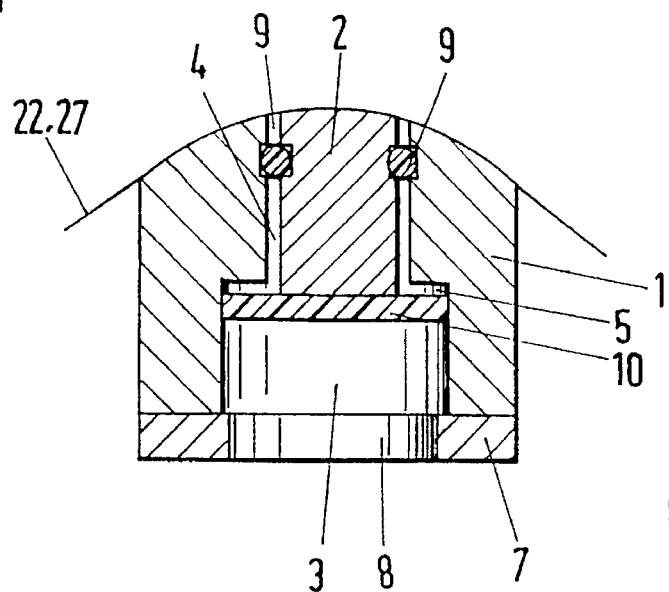
FIG. 1 a cross-section of a first embodiment of an apparatus in accordance with the invention.
Figure 2:
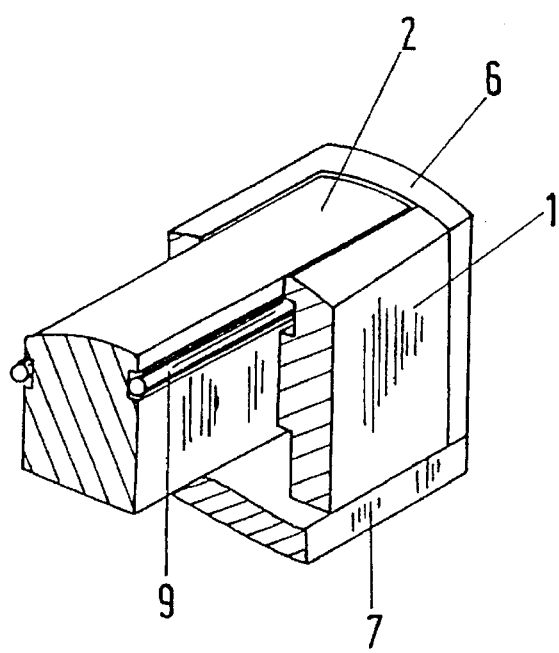
FIG. 2 a section of the apparatus of the invention illustrated in FIG. 1 in a spatial representation.

As shown in FIGS. 1 and 2, the apparatus substantially comprises an elongate receiving or mounting part 1, an elongate member 2 and a force sensor 3. It is noted that two or more force sensors 3 can be used which are arranged at regular intervals.

The mounting part 1 has a cut-out extending in the longitudinal direction. This cut-out has a first section 4 in which the member 2 is held and a second section 5 in which the force sensor 3 is arranged. Moreover, a plate 6 is provided which closes off the cut-out at an end face of the receiving part 1. The force sensor 3 is arranged on a base plate 7 which comprises for example a hole 8 for the feed-through of the connection lines (not shown) of the force sensor 3 and which is secured to the receiving part 1. The cut-out is thus closed off on the underside.

Grooves extending in the longitudinal direction are formed in the side surfaces of the first section 4 of the cut-out and of the member 2. Member 2 is, on the one hand, held by a first elastic element 9 in the first section 4 of the cut-out and, on the other hand, supported via a further elastic element 10 on the force sensor 3.

The elastic element 9 is a rubber cord laid in the grooves and surrounds the member 2 on, for example, three sides. A rubber ring can also be used instead of the cord and surrounds the member 2 on all sides (FIG. 3).

As can be seen from FIG. 1, the rubber cord 9 centers the member 2 within the cut-out 4 and seals the gap between the cut-out and the member against the intrusion of fiber. The function of the rubber cord 9 can be seen from FIG. 4. An elastically sprung support in all directions is achieved as a result of the rubber cord which is determined in dependence on the cross-section of the member 2, so that the force sensor can be simply and precisely associated with this arrangement. Instead of the plate 10, a layer of elastic material can be mounted onto the force sensor.

Figure 5:
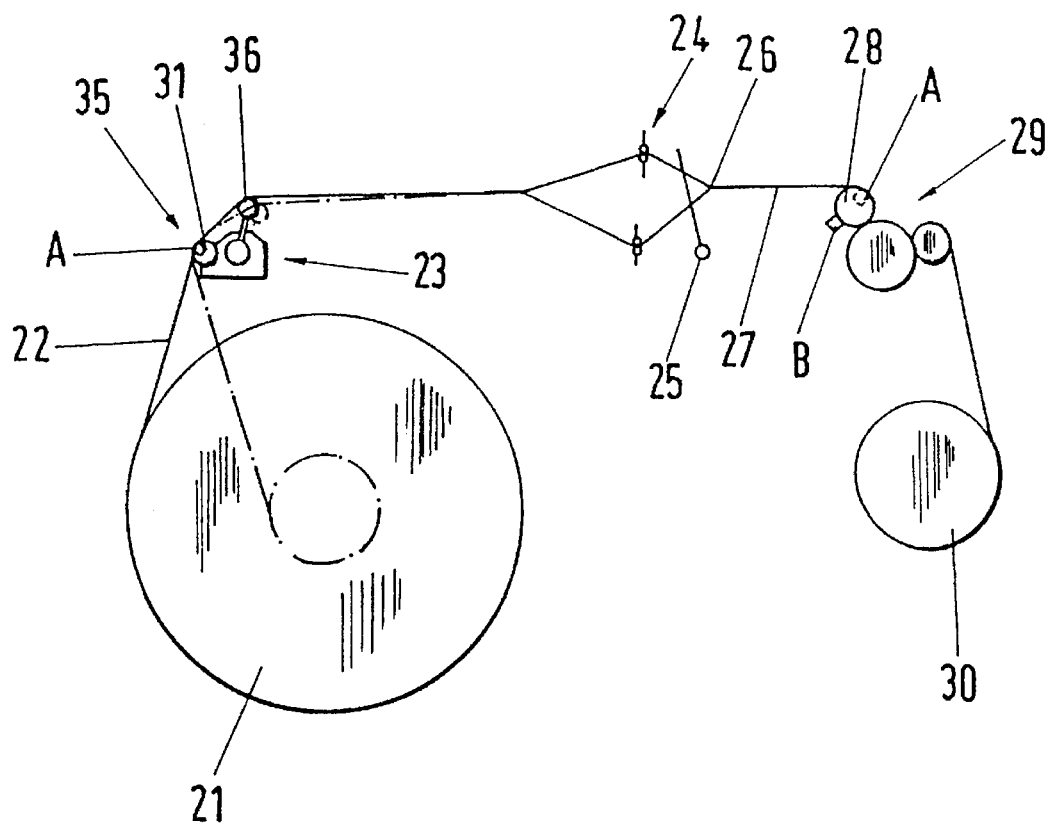
FIG. 5 a schematically represented course of a warp and of the cloth in a weaving machine.

The embodiment of the measurement apparatus A described above can be arranged in the course of the warp and/or of the cloth. As shown in FIG. 5, the warp yarns 22 wound off from a warp beam 21 controlled by a warp regulator run via a warp tensioner 23 to a plurality of healds 24 and through a reed 25 up to the interlacing point 26. After the interlacing point, the cloth 27 runs via a breast beam 28 and a fabric take-off device 29 to a cloth beam 30 where the fabric is wound up.

Figure 3:
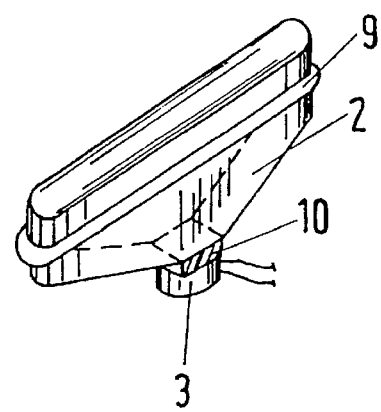
FIG. 3 a spatial representation of a first embodiment of a member in accordance with the invention.
Figure 6:
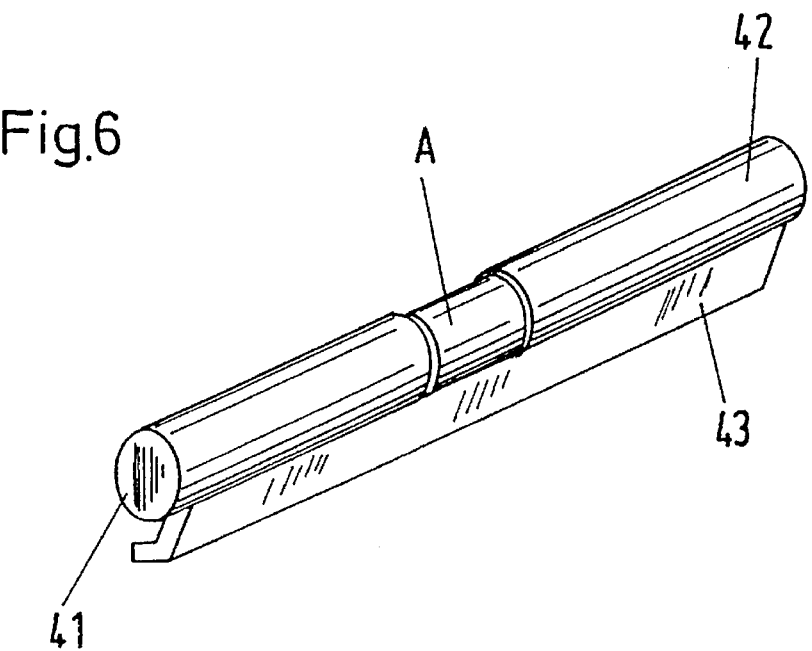
FIG. 6 an arrangement in accordance with the invention of the apparatus of FIG. 1 in a spatial representation.

The embodiment of the measurement apparatus of FIGS. 2 and 3 is suited for a direct measurement at the warp or at the cloth. Various positions are available in the course of the warp and/or the cloth for use of the measurement apparatus. In the course of the warp 22, the measurement apparatus can be arranged in the deflection region 35 of the deflection beam or roller 31, i.e. advantageously directly in a cut-out in the deflection beam. In the course of the cloth or fabric 27, the measurement apparatus can be arranged in the region of the breast beam 28. An embodiment is shown in FIG. 6. Here, the breast beam comprises two sections 41, 42 arranged on a holder 43 spaced apart from one another, with the measurement apparatus being arranged between the sections and being secured to the holder 43. It is noted that for sectional warp beams a measurement apparatus is provided for each sectional warp beam as described above for the breast beam.

FIGS. 7 and 8 show another embodiment of a measurement apparatus B in accordance with the invention in which a part of the apparatus is arranged in the breast beam. The breast beam 51 is mounted on a holder 52 which has a cut-out 53 in the region underneath the breast beam.

Figure 10:
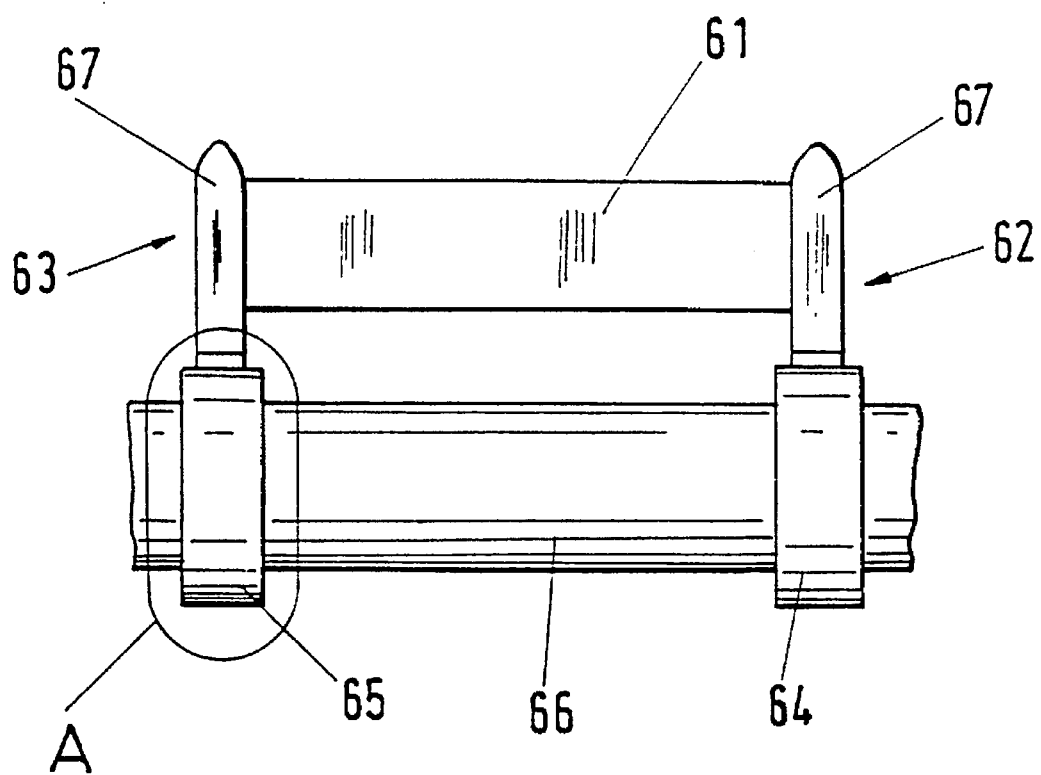
FIG. 10 a side view of a third embodiment of an apparatus in accordance with the invention.

FIG. 10 shows an apparatus with a rotatable thread-guiding member 61 which is mounted in a mounting part 62 fixed relative to the holder 64, 65 and in a movable mounting part 63. The mounting parts 62, 63 are respectively secured via a holder 64, 65 to a carrier 66, so that the axes of the mounting parts lie laterally displaced relative to the axis of the carrier. The mounting parts 62, 63 have a ring 67 with a rolling element bearing (not shown) in which the thread guiding member 61 is arranged. While the fixed mounting part 62 is fixedly connected to the holder 64, the movable mounting part 63 contains a pressure measuring device which is illustrated in FIG. 11.

Figure 11:
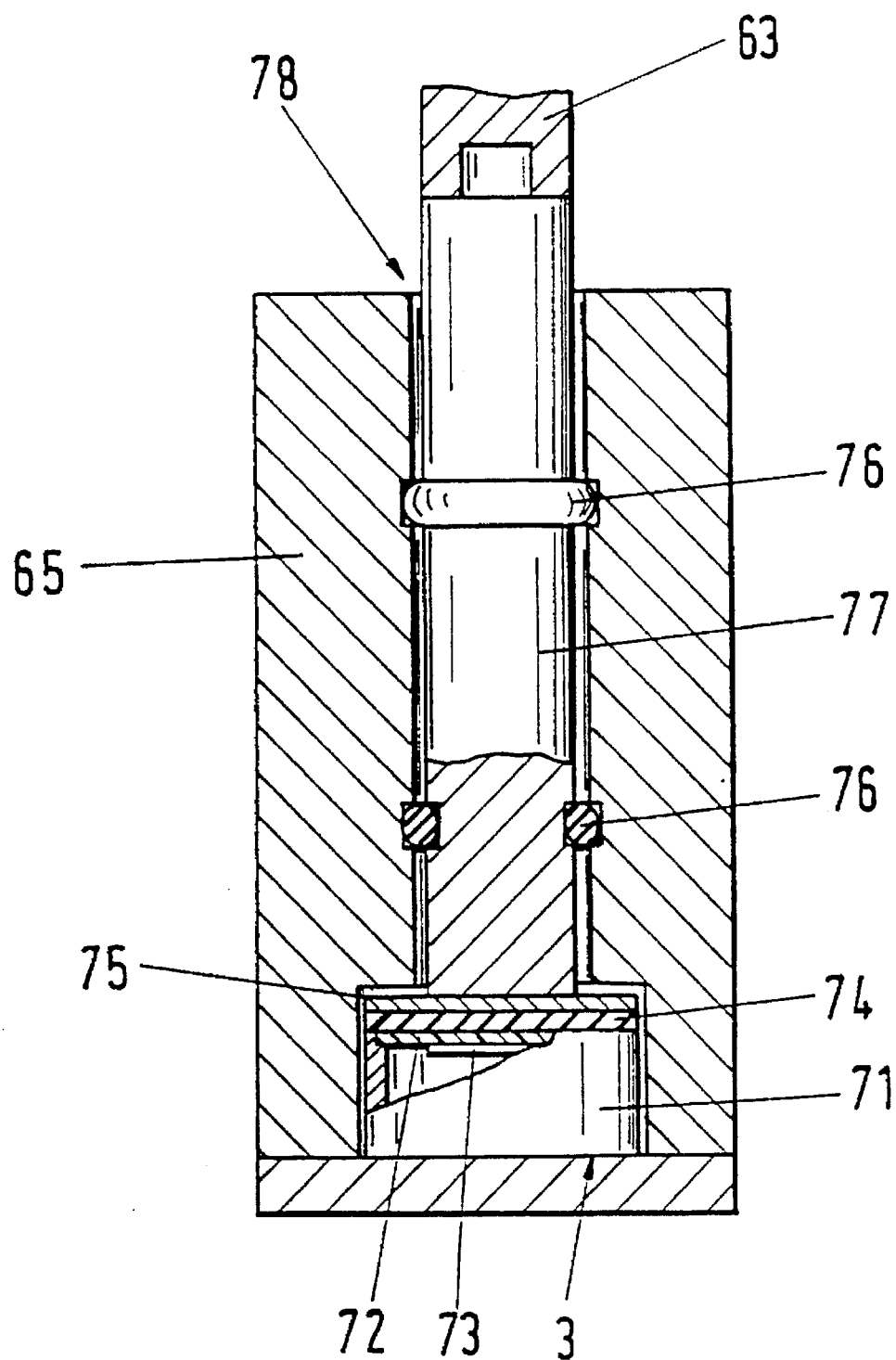
FIG. 11 an enlarged cross-sectional view of detail A in FIG. 10.

As FIG. 11 shows, the pressure measuring device contains a force sensor or pick-up 3 with a housing 71, a plate 72 which is resilient in bending, a signal generator 73 and a layer 74 of resilient material, a metal plate 75 which lies on the layer 74, two rubber rings 76 and a cylinder-shaped member 77 which is connected at one end to the mounting part 63. In the holder 65 there is formed a bore 78 with a first section for receiving the force sensor 3 and the metal plate 75, and with a second section for receiving the cylinder-like member 77. Grooves into which the rubber rings 76 are inserted are formed in the second section of the bore 78 and in the cylinder-like member 77. The arrangement of the rubber rings 76 in the bore 78 is selected so that the member 77 which is connected to the mounting part 65 is resiliently held at one end by the rubber rings 76 in the second section and is supported at the other end on the force sensor 3 via the metal plate 75.

As in the apparatus of FIG. 1, the rubber rings 76 center the cylinder-like member 77 within the second section of the bore 78 and seal the gap between the bore and the member against fiber fly.

Figure 4:
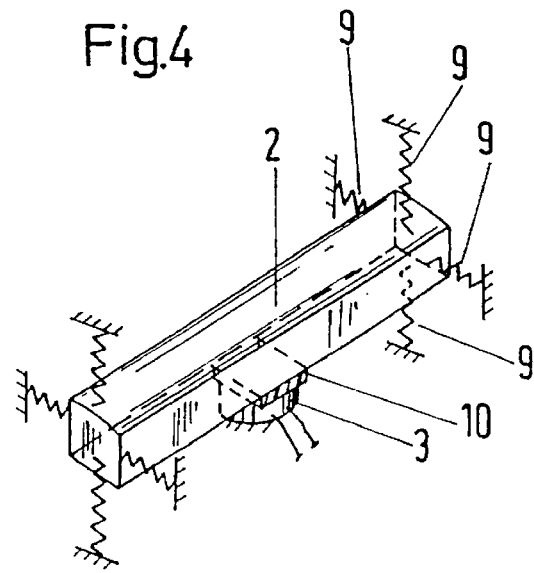
FIG. 4 a schematic representation to explain the action of the first elastic element.

The function of the rubber ring 76 is analogous to that explained for the apparatus of FIG. 1 and with reference to FIG. 4.

Through the above explained arrangement of the cylinder-like member 77 a force applied by the warp threads to the movable mounting part 65 is introduced into the force sensor 3, with the metal plate 75 serving in advantageous manner for a uniform distribution of the force.

It should be added that the rings 67 at the mounting parts 62, 63 define a region of the warp which is used for the measurement of the warp tension.

Figure 12:
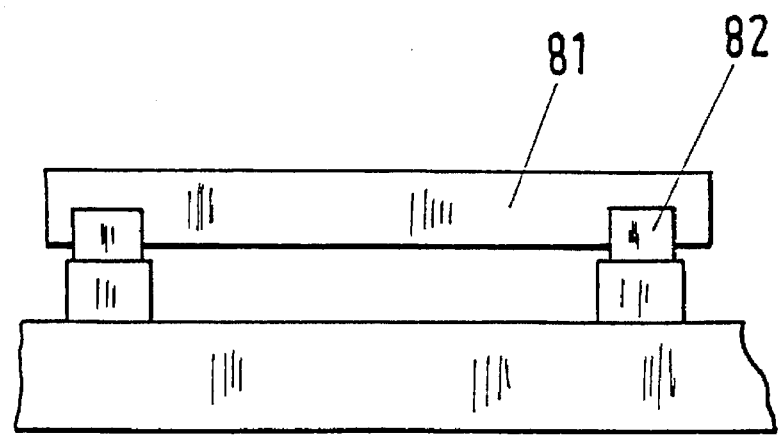
FIG. 12 a side view of a fourth embodiment of an apparatus in accordance with the invention.

The apparatus of FIG. 12 is distinguished from that of the apparatus of FIG. 10 essentially in that a thread-guiding member 81 is journalled in bearing shells 82. This apparatus is in particular suitable for pressure pick-up at a cloth.

As already mentioned, the apparatuses of the invention are suitable for a direct measurement at a warp or at a cloth. In order to achieve this, the thread guiding members are so arranged in accordance with the invention at a point of deflection of the warp or of the cloth that the resulting force component K is essentially always directed perpendicularly onto the force sensor.

Figure 14:
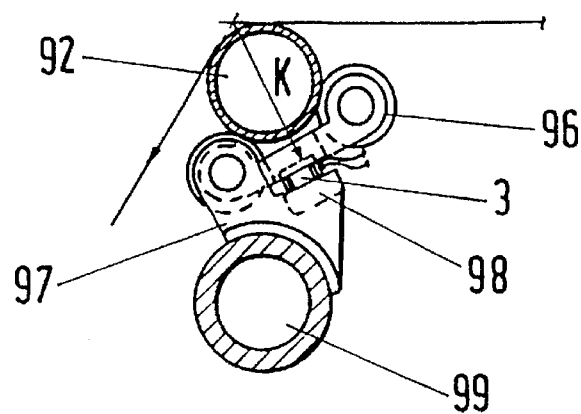
FIG. 14 an end cross-sectional view of a sixth embodiment of an apparatus in accordance with the invention.
Figure 13:
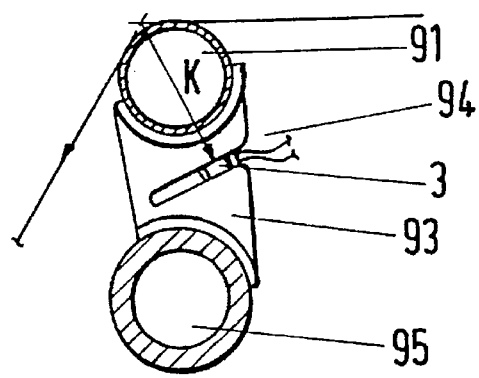
FIG. 13 an end cross-sectional view of a fifth embodiment of an apparatus in accordance with the invention.
Figure 9:
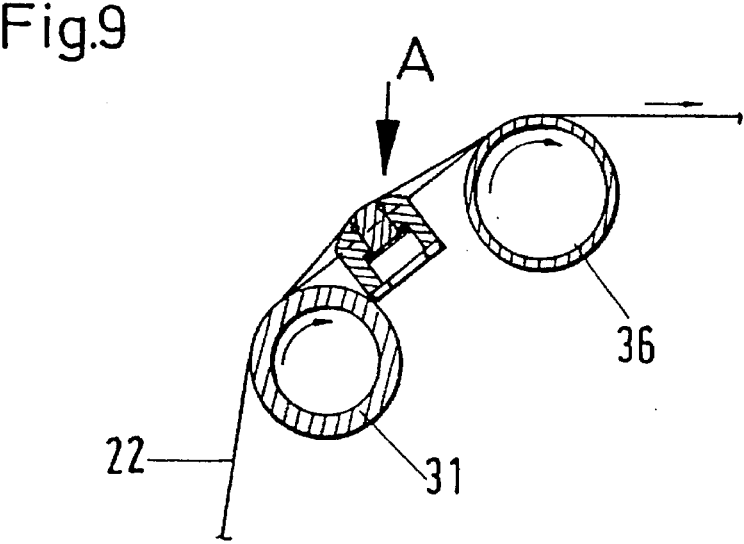
FIG. 9 an end cross-sectional view of a second arrangement in accordance with the invention of the apparatus of FIG. 1 in section.

The FIGS. 13 and 14 show further embodiments of the apparatus of the invention with a rotationally fixedly arranged thread-guiding member 91 being provided in FIG. 13 and a rotatably arranged thread-guiding member 92 being provided in FIG. 14.

As FIG. 13 shows, a thread-guiding member 91, for example a tension beam, is secured to a bending support 93 with a cut-out 94 for receiving a force sensor 3. The bending support 92 is adjustably secured to a carrier 95 in order to adjust the resulting force component K.

As FIG. 14 shows, a thread-guiding member 92, for example a tension beam, is arranged on a roller bearing arrangement 96 which is pivotally arranged on a support 97. The force sensor 3 is hereby so arranged on a shoulder 98 provided at the support 97 that the roller bearing arrangement lies on the force sensor 3. The support 97 is adjustably arranged on a carrier 99 for the purpose of adjusting the resulting force component K.

The apparatus contains a force measuring device with a force sensor or pick-up 3 and a member 2 which is in active communication with the force sensor 3 in order to transfer a force acting on the member 2 onto the force sensor. The force sensor 3 is provided with a resilient means 10 in order to improve the introduction of force, on the one hand, and to damp mechanical oscillations, on the other hand.

We claim:

1. Apparatus for measuring warp tension comprising:

a body defining an open cavity therein;

a force sensor (3) mounted within the cavity;

a force transmitting member (2, 77) mounted in the cavity in force transmitting relation with the force sensor (3); and resilient positioning means (9, 76) for positioning the force transmitting member within the cavity in a manner to permit a force applied to the force transmitting member to be transmitted to the force sensor.

2. Apparatus in accordance with claim 1, characterized in that a resilient layer (10) is present between the force sensor (3) and the force transmitting member (2, 77).

3. Apparatus in accordance with claim 1, characterized in that the force sensor (3) comprises a plate (72) flexible in bending and at least one signal generator (73) in force-receiving communication with said plate.

4. Apparatus in accordance with claim 3, characterized in that the signal generator (73) is a strain gauge or a piezo-quartz.

5. Apparatus in accordance with claim 1 characterized in that the resilient means (9, 76) consists of an elastomeric substance selected from the group consisting of silicone rubber, nitrile rubber, polyurethane and mixtures of said silicone rubber, nitrile rubber and polyurethane.

6. Apparatus in accordance with claim 2, characterized by a metal plate (75) which is arranged between the resilient means (10, 74) and the force transmitting means (2, 77).

7. Apparatus in accordance with claim 1, characterized in that the member is formed as an elongate body having lateral sides, said elongate body being engaged by the resilient positioning means (9, 76) at least at the lateral sides.

8. Apparatus in accordance with claim 7, wherein the member comprises a transfer member (77), partially housed within the cavity, and a thread guiding member (61, 81), external of the cavity connected to the transfer member (77).

9. Apparatus in accordance with claim 8, characterized in that the thread-guiding member (61) is a rotatable member rotatably mounted to the transfer member.

10. Apparatus in accordance with claim 1, characterized in that the member is formed as a cylindrical body (77) which is held at its circumference.

11. Apparatus in accordance with claim 1, characterized in that the resilient positioning means (9, 76) is an elongate or ring-shaped structure with a circular cross-section.

12. Apparatus for measuring warp tension comprising:

a body defining an open cavity therein;

a force sensor (3) mounted within the cavity;

a force transmitting member (2, 77) mounted in the cavity in force transmitting relation with the force sensor; and a resilient plate-like member (74) positioned between the force transmitting member (2, 77) and the force sensor (3).

13. Apparatus in accordance with claim 12, characterized in that the force transmitting member (2; 77) is held in a cutout by resilient positioning means (9, 76).

14. Apparatus for measuring warp tension comprising:

a body defining an open cavity (94) therein;

a force sensor (3) mounted within the cavity (94);

a force transmitting element (91) in force transmitting relation with the force sensor (3);

the element (91) comprising a thread-guiding member (91) and said body comprising a flexible support (93) with said cavity (94) for receiving said force sensor (3); and said support (93) being fixedly connected at one end to a carrier (95) and, at the other end, to said thread-guiding member (91).

15. Apparatus for measuring warp tension comprising:

a support (97) defining a shoulder (98);

a force sensor (3) mounted at the shoulder (98);

a force transmitting member (92, 96) being in force transmitting relation with the force sensor (3);

the member (92, 96) comprises a thread-guiding member (92) and a roller bearing device (96) which is pivotally arranged on said support (97), said device (96) in force-transmitting communication between the force sensor (3) and the thread-guiding member (92).

16. A loom comprising:

a warp beam (21) providing warp yarn (22) along a path to a cloth beam (30);

apparatus for measuring warp tension comprising:

a body defining an open cavity therein;

a force sensor (3) mounted within the cavity;

a force transmitting member (2, 77) mounted in the cavity in force transmitting relation with the force sensor (3); and resilient positioning means (9, 76) for positioning the force transmitting member within the cavity in a manner to permit a force applied to the force transmitting member to be transmitted to the force sensor; and the apparatus positioned along the path at the warp beam (21) or at the cloth beam (22) so that a force is exerted substantially perpendicular to said force sensor (3).

17. Loom in accordance with claim 16, wherein the loom comprises a warp tensioner (23) along the path, the warp tensioner comprising a diverting beam (31) and a tensioning beam, characterized in that the apparatus is disposed at a chosen one of the following locations: at the diverting beam (31) or between the diverting beam (31) and the tensioning beam (36).

18. Loom in accordance with claim 16, wherein the apparatus comprises a breast beam (28) along the path, characterized by that the apparatus is arranged beneath the breast beam (28).

19. Loom in accordance with claim 18, characterized in that the breast beam consists of at least two sections (41, 42) which are arranged lying on a line spaced apart from one another, and in that the measuring apparatus (A) is, in each case, arranged between the breast beams sections (41, 42).

20. Loom in accordance with claim 16, wherein the apparatus comprises a breast beam (28) along the path, characterized in that the apparatus is arranged at the breast beam (28).

\* \* \* \* \*